United States Patent [19]

Klancnik et al.

[11] 4,402,642
[45] Sep. 6, 1983

[54] MACHINE TOOL BAR FEED

[75] Inventors: Adolph V. Klancnik, Glenview; Kenneth A. Klancnik, Palatine, both of Ill.

[73] Assignee: Universal Automatic Corporation, Des Plaines, Ill.

[21] Appl. No.: 224,463

[22] Filed: Jan. 12, 1981

[51] Int. Cl.³ .............................................. B23Q 5/22
[52] U.S. Cl. ................. 414/18; 254/DIG. 6; 198/795; 74/501 R; 414/214
[58] Field of Search ............ 414/14, 15, 16, 18, 414/214, 46; 254/DIG. 6; 198/795, 321, 678; 74/501 R, 501.5 R, 502

[56] References Cited

U.S. PATENT DOCUMENTS

| 647,347 | 4/1900 | Wellman et al. ................ 414/214 |
| 2,424,055 | 7/1947 | Rousseau ....................... 198/795 X |
| 2,877,886 | 3/1959 | Braid ............................. 198/795 X |
| 3,746,190 | 7/1973 | Hotz .............................. 254/DIG. 6 |
| 3,799,363 | 3/1974 | Ross ................................ 414/18 X |
| 3,809,253 | 5/1974 | Mercer ................................ 414/18 |
| 3,874,520 | 4/1975 | Scheler ............................... 414/18 |
| 3,889,822 | 6/1975 | Ross .................................. 414/18 |
| 3,918,594 | 11/1975 | Durst et al. ........................ 414/18 |
| 4,229,134 | 10/1980 | Reist ................................. 414/46 |

FOREIGN PATENT DOCUMENTS 153158 5/1952 Australia ............................ 414/15

*Primary Examiner*—Robert J. Spar
*Assistant Examiner*—Terrance L. Siemens
*Attorney, Agent, or Firm*—Kinzer, Plyer, Dorn & McEachran

[57] ABSTRACT

Bar stock is fed to the chuck of a machine tool by a ball chain having a rigid pusher at the end engagable with the bar stock, the ball chain being advanced by a wheel having pockets for the ball chain.

7 Claims, 5 Drawing Figures

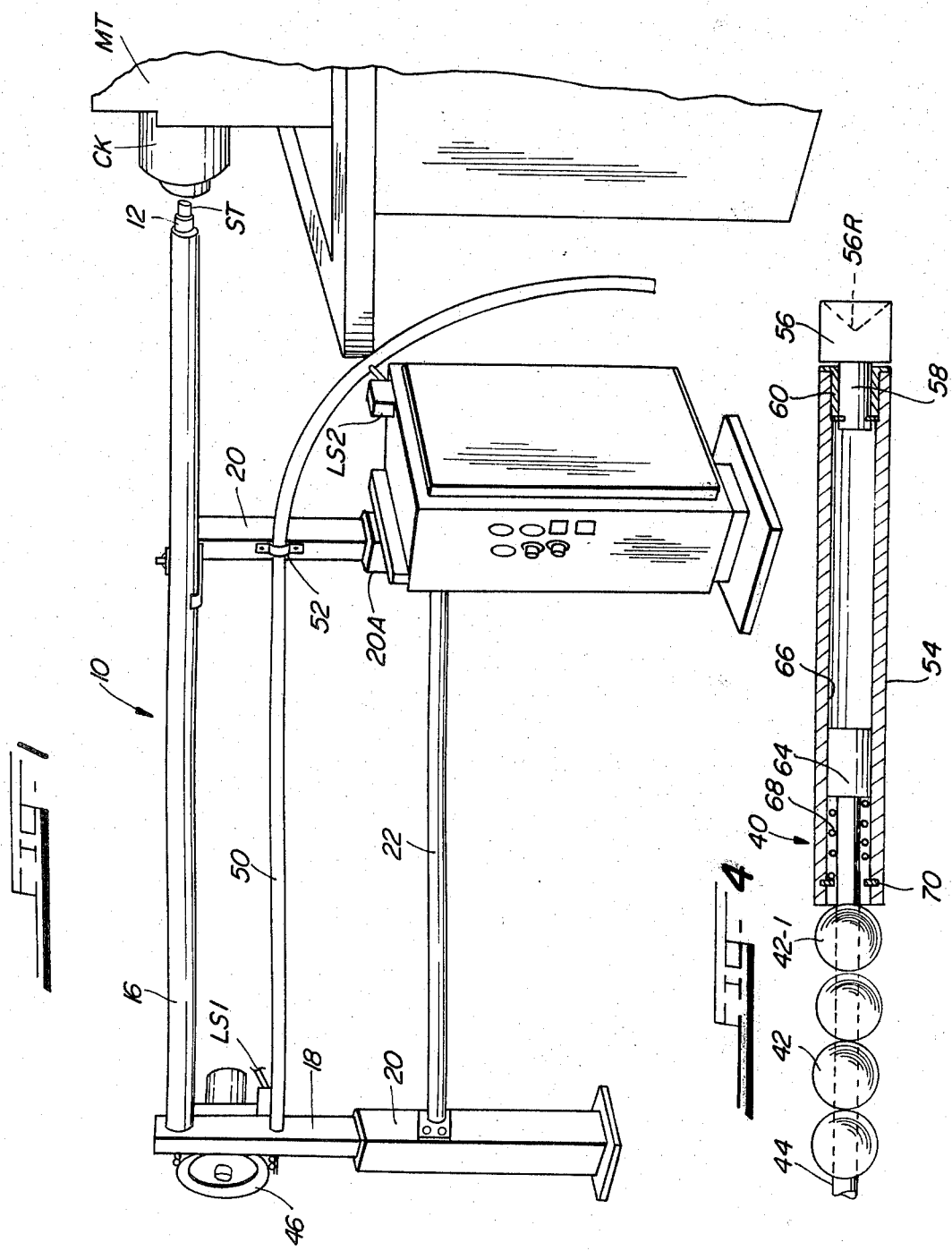

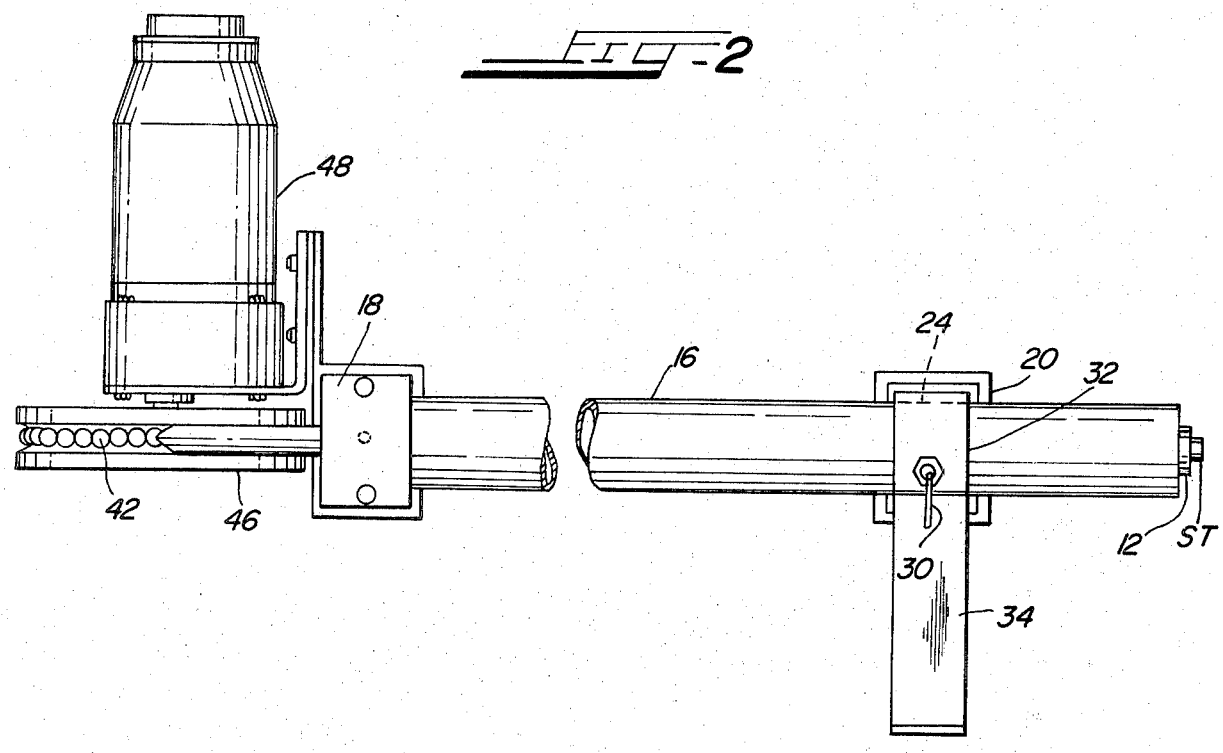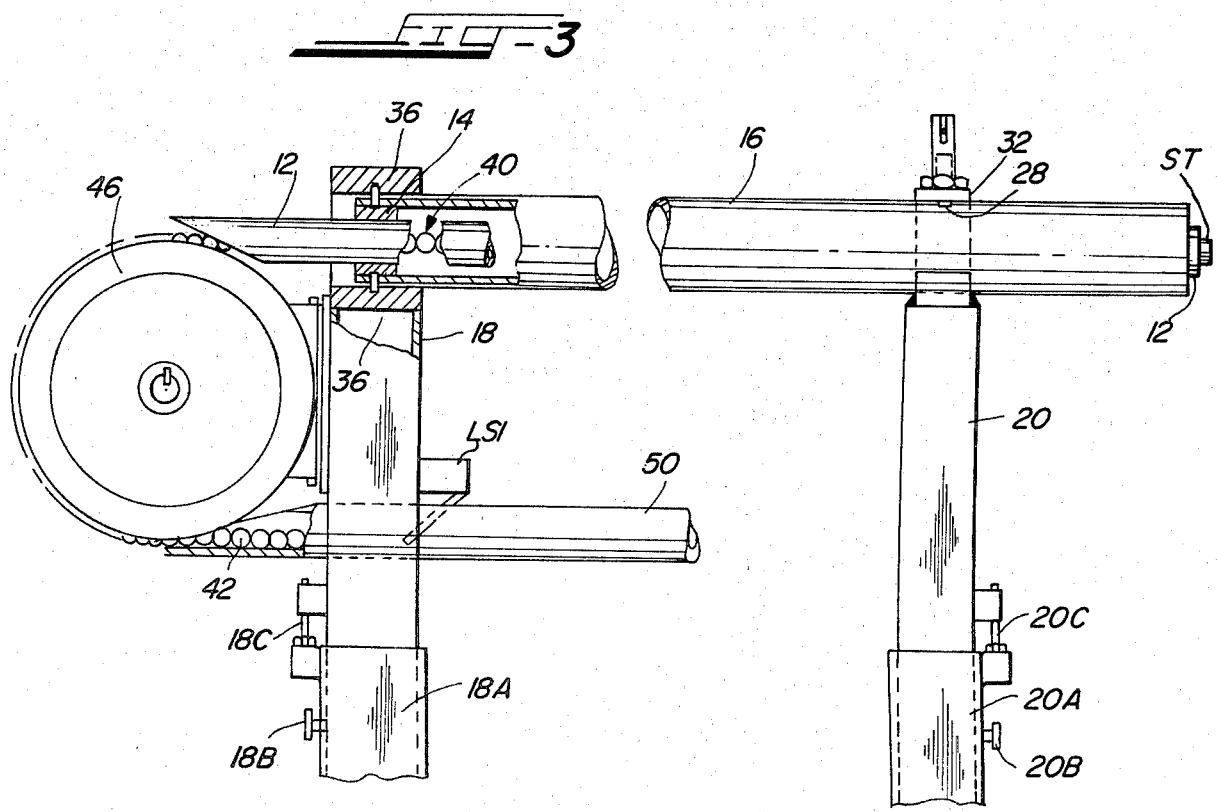

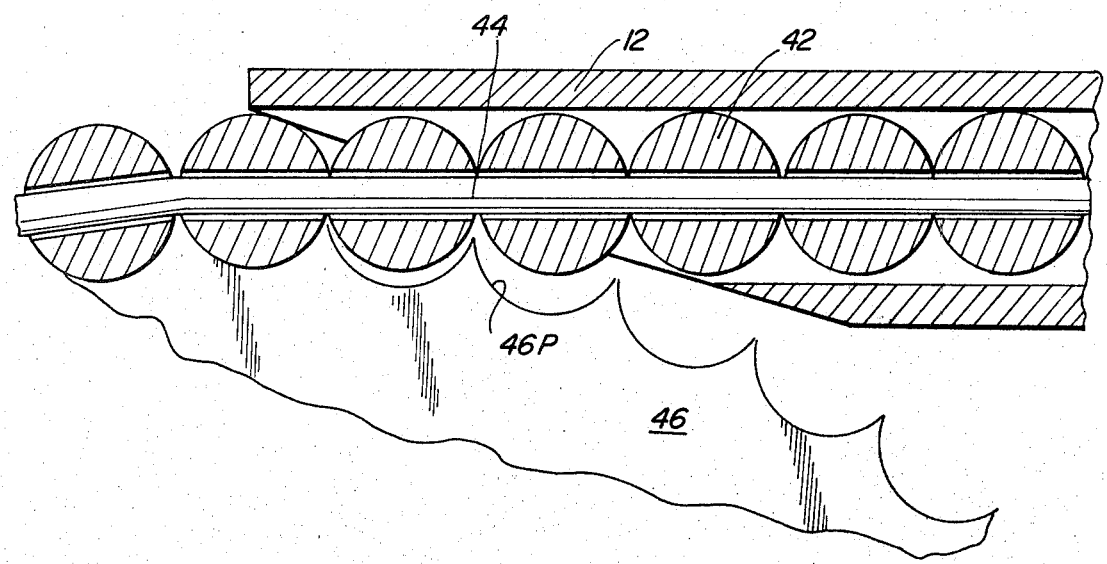

MACHINE TOOL BAR FEED

This invention relates to a bar feed mechanism in the form of a self-contained unit for advancing bar stock to and through the spindle of a lathe such as the automatic turret lathe disclosed in application Ser. No. 060,790 filed July 25, 1979, but it is adaptable to any lathe of similar capacity such as round, hexagon, or square steel bars up to twelve feet long.

The invention may be introduced by observing first the capability of the apparatus and its adaptations to a machine tool. The bar feed mechanism is preferably capable of being plugged into and electrically interlocked with a lathe. An electric motor drive with current override and reversing capability is used to advance and retract the bar stock feeder which is in the form of a ball chain, preferably at a variable feed rate of about sixty inches to sixty feet/minute, with selective torque capability.

The bar feed mechanism will advance bar stock material through the spindle when, and in the length, required during automatic operation of the machine tool. The feeder is activated by a signal that the spindle collet is open. Bar stock is advanced until engaged with the revolving stock stop of the machine tool, activating a current override which closes the collet and initiates a machine cycle. After a period of time, the drive is interrupted until the next bar feed cycle is required.

For hand or manual operation, the operator initiates the bar feed cycle by a hand palm button. The drive again advances the bar stock to the revolving stop of the machine tool and the current override becomes effective in the manner above described, including drive interruption. The hand operation palm button plugs to the same electric cable used to interlock the bar feed mechanism with the lathe in automatic operation.

The manual mode, used when loading bar stock into the bar feed mechanism, allows the operator to advance or retract the bar stock feeder. When loading a new bar into the bar feed mechanism, the operator must open the collet of the machine tool and remove the unused bar end. The pusher or feeder chain, to be described, is then retracted from the stock or guide tube and restored by the correct length to the chain storage tube, as will be described. The stock tube or guide is pivoted clear of the lathe spindle and a new bar is inserted. The guide is restored, and the pusher chain is advanced around a drive wheel and into the guide until it is in position to advance the bar stock through the machine tool spindle. The bar feed mechanism may then be restored to automatic operation, allowing the automatic machining cycle to be resumed.

Advantageously there will be a control unit which provides the operator with switches to control automatic and manual operation:

Power: Provides power to the bar feed mechanism and the selectable modes can be:

On: Power is present throughout the unit. This position would be selected before the bar feed mechanism can be operated.

Off: Power is removed from the bar feed mechanism.

Cycle: Allows manual operation of the bar feed mechanism and the selectable modes are:

Man. Return: The pusher chain retracts from the stock tube; automatic bar feed cannot occur.

Auto: The bar feed mechanism is ready for automatic operation and must be selected before an automatic bar feed cycle can be initiated.

Man. Advance: The pusher chain advances the bar stock through the spindle, automatic bar feed cannot occur when this position is selected.

Advance Feed and Torque Adjust: Potentiometers allow for advance feed, and the torque override limit of the pusher drive to be adjusted for various bar feed requirements.

Two limit switches are used in monitoring operation and setup of the bar feed mechanism. The first is an "out of stock" limit switch. This limit switch is interlocked with the automatic cycle signal to disable the bar feed mechanism when the mechanism is sensed as out of bar stock. The second limit switch is employed to indicate when the feeder chain is in a restored position ready to feed a new length of bar stock.

The bar feed mechanism may be interlocked with the control panel of the aforementioned automatic turret lathe. The control panel would confirm the following:

1. The bar feed mechanism is plugged into the control panel of the turret lathe;
2. Power is present in the bar feed mechanism; and
3. The bar feed mechanism is not out of stock.

The control panel initiates automatic operation of the bar feed mechanism until the "out of stock" limit switch prevents institution of an automatic cycle.

In the hand operation mode, the hand palm button initiates the automatic operation of the bar feed mechanism until the "out of stock" limit switch prevents auto cycle.

Among the objects of the invention are to construct a bar feed mechanism in which the foregoing capabilities may be achieved, to construct a bar feed mechanism having the durability of a ball chain compared to feed fingers, to construct a bar feed mechanism which does not grip but only pushes the bar stock and to construct a bar feed mechanism which is safer than a fluid operated piston and which has superior incremental motion.

In the drawing:

FIG. 1 is a perspective view of the bar feed mechanism of the present invention juxtaposed to one side of a related machine tool;

FIG. 2 is a top elevation, broken away, of the bar feed mechanism;

FIG. 3 is a side elevation of the apparatus shown in FIG. 2;

FIG. 4 is a detail view of the pusher and a fragment of the ball chain; and

FIG. 5 is a detail view of the feed wheel and chain on an enlarged scale.

The bar feed mechanism of the present invention is identified by reference character 10 and is shown as positioned at the left-hand side of machine tool MT. The machine tool has a chuck CK to which is fed bar stock material ST from which parts are to be made on the machine tool.

The length of bar stock, fed horizontally, is positioned inside a tubular guide 12, FIG. 3, which in turn is supported on a horizontal axis by a plurality of sleeve-like supports 14 fixed inside an elongated housing 16, tending to eliminate vibration and to muffle operation noise.

The guide 12 and its associated housing 16 are supported by a pair of uprights 18 and 20, braced by a spacer 22.

The upright 20 near the machine tool MT is provided with a C-clamp 24 including a cradle which receives the housing 16 and a spring-biased plunger 28, which can be opened by a handle 30, normally serving to hold the position of the housing 16 in the cradle.

The cradle 24 includes an upper plate 32 and a lower plate 34 and as can be seen in FIG. 3 the plunger or detent 28 is retained in the upper plate 32. The lower plate 34 is extended as evident in FIG. 2 and this enables the guide housing to be supported when swung outward toward the observer to a loading position as will now be explained.

As shown in FIG. 4, the end of the housing 16 remote from the machine tool is pivoted to the upper end of the upright 18 by a pair of pins 36 and hence by releasing or opening the catch 28 the housing 16 may be swung toward the observer as viewed in FIG. 1 while supported on the outboard end of plate 34 to enable a fresh length of bar stock to be inserted into the guide tube 12.

In accordance with the present invention, the bar stock material is fed to the chuck of the machine tool by a ball chain feeder 40, FIGS. 3 and 4. The ball chain feeder comprises a plurality of metal balls 42 tightly threaded on a cable 44, FIG. 4, and the assembly is trained about a feed wheel 46 (e.g. a sprocket) with the balls seated in separate pockets 46P, FIG. 5. The feed wheel is keyed to the output shaft of a reversible, variable speed D.C. motor 48 attached by brackets to the upright 18 as will be evident in FIGS. 2 and 3. It may be mentioned at this point that the uprights 18 and 20 are telescoped into the upper ends of corresponding sleeves 18A and 20A, FIG. 3, and each is adapted to be locked in an adjusted position by a sturdy thumbscrew 18B and 20B, respectively. Accurate positioning and leveling is achieved by respective adjusting screw and nut assemblies 18C and 20C of a well-known kind.

The ball chain must be of considerable length to advance the last nub of stock metal to the chuck and the portion constituting the trailing supply of ball chain feeder is contained by a tubular receiver or magazine 50 positioned beneath the housing tube 16. One end of the magazine, the end adjacent the wheel 46, is extended through an opening in the upright 18. The opposite end of the receiver or magazine 50 is secured to the upright 20 by a clamp 52, FIG. 1.

As will be described in more detail below, the leading end of the ball chain mechanism 40 includes a rigid pusher shaft 54, FIG. 4, and when the motor is rotating the feed wheel 46 clockwise as viewed in FIG. 1 the pusher is moved to the right along the length of the guide 12, advancing the bar stock to the chucking device associated with the spindle of the machine tool. The trailing portion of the ball chain, inside the magazine 50, is correspondingly shortened.

A limit switch LS1 is supported on the upright 18 in position to have its sensing finger ride on the ball chain to indicate to the drive motor a continuing supply of the ball chain but when the sensing finger of switch LS1 no longer engages the ball chain the sensing finger interrupts the circuit to the drive motor 48.

The tubes 12 and 50 are aligned to the horizontal tangents of wheel 46 and the ends of the two tubes adjacent the wheel are cut on a bias so the balls enter the wheel and leave the wheel along the tangents in a smooth manner.

The drive motor 48 is a reversible motor so the drive chain will be returned to storage as an incident to the counterclockwise rotation of wheel 46, causing the fully extended length of the chain inside the guide tube 12 to be retracted and returned to the magazine 50. To indicate to the motor 48 that the chain has been fully withdrawn (to the extent the leading end is sufficiently retracted in position to allow a new length of bar stock to be inserted into guide 12) a limit switch LS2, FIG. 1, is positioned so that its sensing finger will be actuated when engaged by the trailing end of the ball chain, now being returned to supply; this action at LS2 stops the motor in its reverse travel.

The pusher 54, as shown in FIG. 4, is provided at its leading end with a chamfered socket or head 56 (rotatable) and the chamfer recess 56R therein (cone-shaped) is adapted to neatly receive a corresponding taper at the trailing end of the bar stock material. The rotatable head 56 has a stub shaft 58 supported for rotation by a bearing 60 of any desired kind inside the pusher bar 54.

To assure accurate incremental feeding of the bar stock material it is important that the balls 42 be tightly nested or packed on the cable 44, which is to say that an increment of movement of the feed wheel 46 should be accompanied by a like increment of advance of the bar stock material, no more and no less, with no slack. However, when the aperture is formed (by drilling) in each ball this results necessarily in a flat on each side where the drill penetrates and breaks through. As a consequence, the straight length of the chain, with the balls in tight contact, is less than when the same number of balls are pocketed in the individual pockets 46P of the feed wheel 46 and this is so because a pocket 46P, for accurate incremental movement, must be complemental to the true radius of the ball. In other words, if we assume a given number of balls (with no fractions) neatly fitting a corresponding number of the feed wheel pockets on the circumference of the wheel, there is some "stretching" involved compared to the straight line case and according to the present invention this stretching is made possible by virtue of a lost motion connection between the pusher 54 and the first ball 42-1, FIG. 4.

The lost motion or slack take-up device, as noted, is interposed between the pusher bar and the leading ball 42-1, joining the two, and comprises a stop 64 crimped to the leading end of the cable inside the pusher bar bore 66 which receives the bearing 60. Another stop (not shown) is crimped to the opposite end of the cable.

Before positioning the stop 64 of the cable, a short coil spring 68 is mounted on the leading end of the cable, normally to lie directly behind the stop 64. A C-spring clip 70 is located in the bore 66 behind the spring 68, serving as a stop for the spring.

In an actual example, the following specifications apply:

diameter of wheel 46—7½"
number of pockets—48
cable—⅛" diameter
balls—½" diameter
push rod 54—28" length
fresh bar stock—6' length
chain length—129.5"

The cabinet shown in FIG. 1 to the left of the machine tool houses the electrical circuitry and presents on the front wall the bottons and switches employed for the controls mentioned in the opening part of this specification. The cabinet may also be used to support limit switch LS2.

We claim:

1. Bar feed mechanism for feeding the leading end of an elongated bar of stock metal to a machine tool comprising a bar guide for supporting the bar at one side of the machine tool, a ball chain feed wheel having pockets to receive a ball chain the leading end of which has fixed thereto a rigid pusher for pushing the bar toward the machine tool when the wheel is rotated in a bar feed direction, a ball chain receiver for storing a length of the ball chain which trails the ball chain feed wheel, in which the feed wheel is a sprocket and the pockets therein each have a radius substantially equal to that of the chain balls, the balls being drilled to receive a cable on which the balls are threaded to be in contact with one another when the cable is straight with the ball diameter across the drill hole being less than that of the undrilled diameter, and said pusher being attached at one end to the cable by a lost motion connection including a spring means which allows the cable in effect to extend to accommodate the balls to the wheel pockets.

2. Bar feed mechanism according to claim 1 in which the ball chain guide and ball chain receiver are coaxial with horizontal tangents of the feed wheel, both the guide and receiver being supported by extendible sections of uprights which can be lengthened or shortened to level the bar feed, the guide being pivotally connected to the top of one of said sections and the receiver being mounted therebeneath.

3. Bar feed mechanism according to claim 1 in which a medial portion of the guide is displaceably held by a clamp in turn supported for leveling movement in an extendible section of another upright.

4. Bar feed mechanism according to claim 1 or 3 in which the lost motion connection comprises a stop clamped to the chain and a coil spring on the chain between the pusher and the leading ball.

5. Bar feed mechanism according to claim 1 in which the wheel is driven by a reversible motor and in which limit switches in the circuit of the motor detect a fully advanced and a fully retracted chain.

6. Bar feed mechanism for feeding the leading end of an elongated bar of stock metal to a machine tool comprising a bar guide for supporting the bar at one side of the machine tool, a ball chain feed wheel having pockets to receive a ball chain the leading end of which has fixed thereto a rigid pusher for pushing the bar toward the machine tool when the wheel is rotated in a bar feed direction, the pockets of said feed wheel each having a radius substantially equal to that of the chain balls, the balls being drilled to receive a cable on which the balls are threaded to be in contact with one another when the cable is straight with the ball diameter across the drill hole being less than that of the undrilled diameter, said pusher being attached at one end to the cable by a lost motion connection including a spring means which allows the cable to extend to accommodate the balls to the wheel, and a ball chain receiver for storing a length of the ball chain which trails the ball chain feed wheel.

7. Bar feed mechanism according to claim 6 in which the lost motion connection comprises a stop clamped to the chain and a coil spring on the chain between the pusher and the leading ball.

* * * * *